April 21, 1936.  R. S. EWERS  2,038,481
WIND MOTOR
Filed April 2, 1935   3 Sheets-Sheet 1

Inventor
R. S. Ewers
By Clarence A. O'Brien
Attorney

April 21, 1936.   R. S. EWERS   2,038,481
WIND MOTOR
Filed April 2, 1935   3 Sheets-Sheet 2

Inventor
R. S. Ewers
By Clarence A. O'Brien
Attorney

April 21, 1936.   R. S. EWERS   2,038,481
WIND MOTOR
Filed April 2, 1935   3 Sheets-Sheet 3

Inventor
R. S. Ewers
By Clarence A. O'Brien
Attorney

UNITED STATES PATENT OFFICE 2,038,481

WIND MOTOR

Rolo S. Ewers, Coolidge, Kans., assignor to Airotar Development Company, Coolidge, Kans., a corporation Application April 2, 1935, Serial No. 14,364

3 Claims. (Cl. 170—38)

This invention relates to certain new and useful improvements in wind motors.

The invention is concerned particularly with the mounting of the wind wheels or propellers whereby the latter may turn out of the wind, at high winds, together with efficient means for returning the wind wheels or propellers into the wind to the end that the device will not be easily damaged during high wind storms and will operate to provide even power.

The invention together with its objects and advantages will be best understood from a study of the following description taken in connection with the accompanying drawings wherein.

Figure 1:
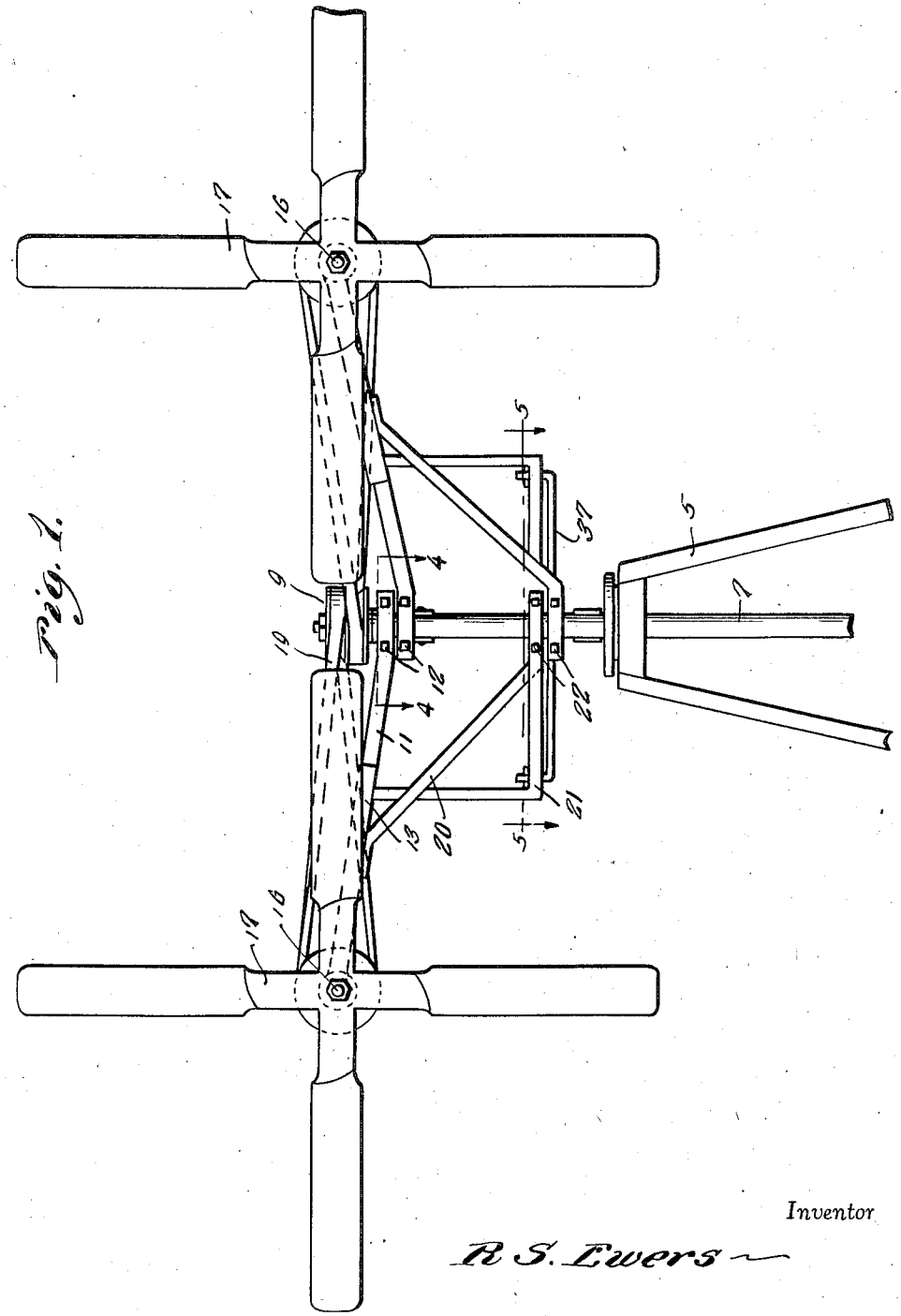
Figure 1 is a front elevational view.

Figures 4 and 5 are detail views taken substantially on the line 4—4 and 5—5 respectively of Figure 1.

Figures 3, 6:
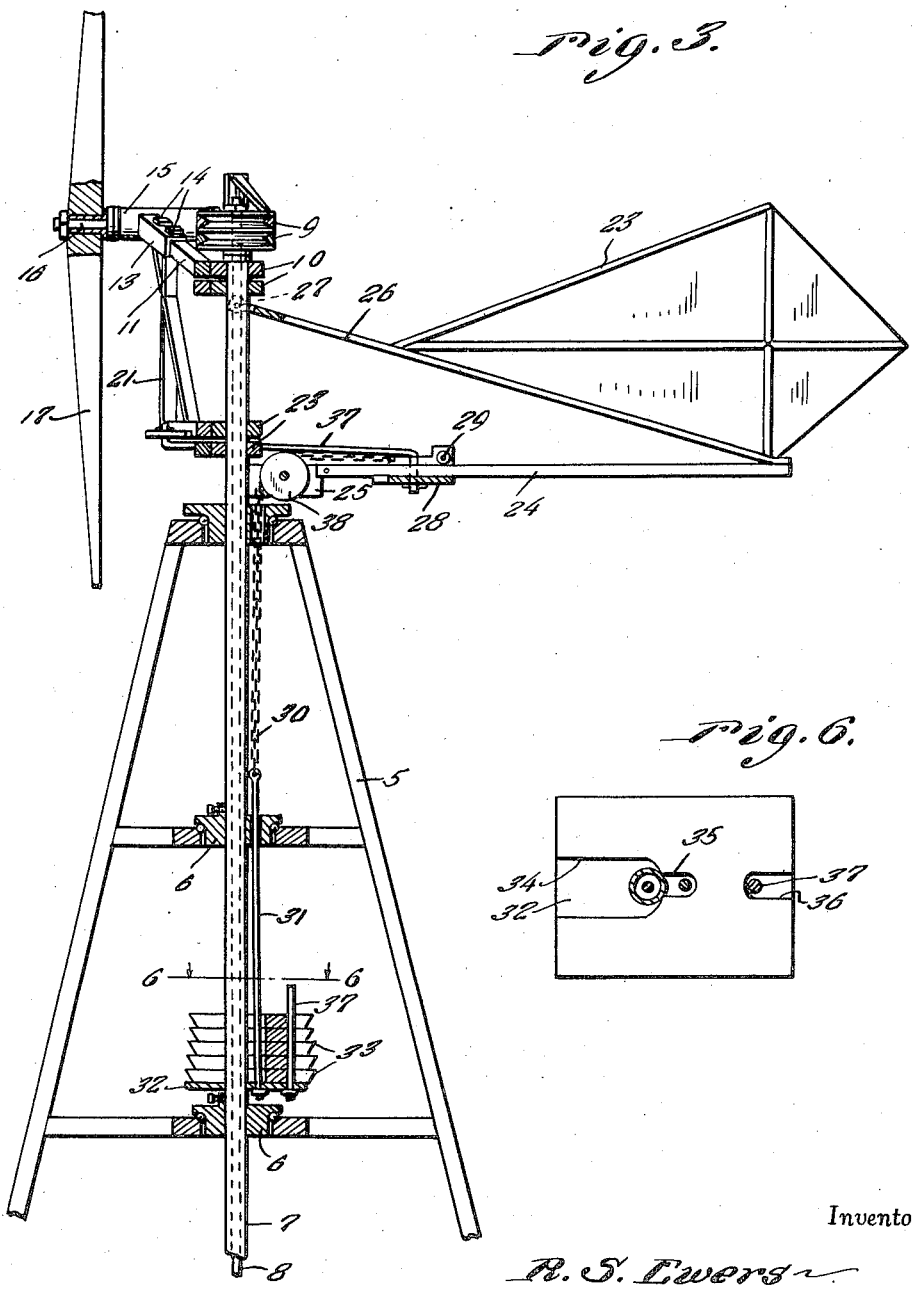
Figure 3 is a side elevational view with certain parts removed and other parts shown in section.

Figure 6 is a detail view taken substantially on the line 6—6 of Figure 3.

Referring to the drawings by reference numerals it will be seen that the wind motor comprises a suitable tower 5 of any suitable and conventional construction and provided for the reception of bearings 6 and inner collars or races of which are secured to a vertical tube 7 in which is housed the driven shaft 8. On its upper end the driven shaft 8 is provided with upper and lower pulleys 9. Rotatable about the upper portion of the tubular casing 7, as an axis, are upper and lower blocks 10 to which are secured oppositely and upwardly extending relatively fixed arm sections 11, these arm sections being secured to the respective blocks 10 by bolts or in any other suitable manner and as indicated generally at 12.

Adjustable arm sections 13 are associated with the arm sections 11 and are secured in adjusted position thereon through the medium of bolts or the like 14. On the outer or free end of the arm sections 13 are transversely extending bearings 15 in which are journaled the propeller or wind wheel shaft 16. Secured to the forward end of the shaft 16 are suitable propellers or wind wheels 17 while secured to the rear end of the shaft 16 are pulleys 18. Trained over the pulleys 18 and pulleys 9 are drive belts 19 whereby power from the shaft 16 is transmitted to the shaft 8 for driving the latter.

For the relatively fixed arms 11 there are provided braces, each brace being in the form of an integral structure including a diagonal part 20 and a substantially L-shaped part 21. The parts 21 of the braces are secured by bolts or in any other suitable manner and as indicated generally at 22 to blocks 23 arranged one above the other below the blocks 10 and rotatable also about the casing 7 as an axis.

Figure 2:
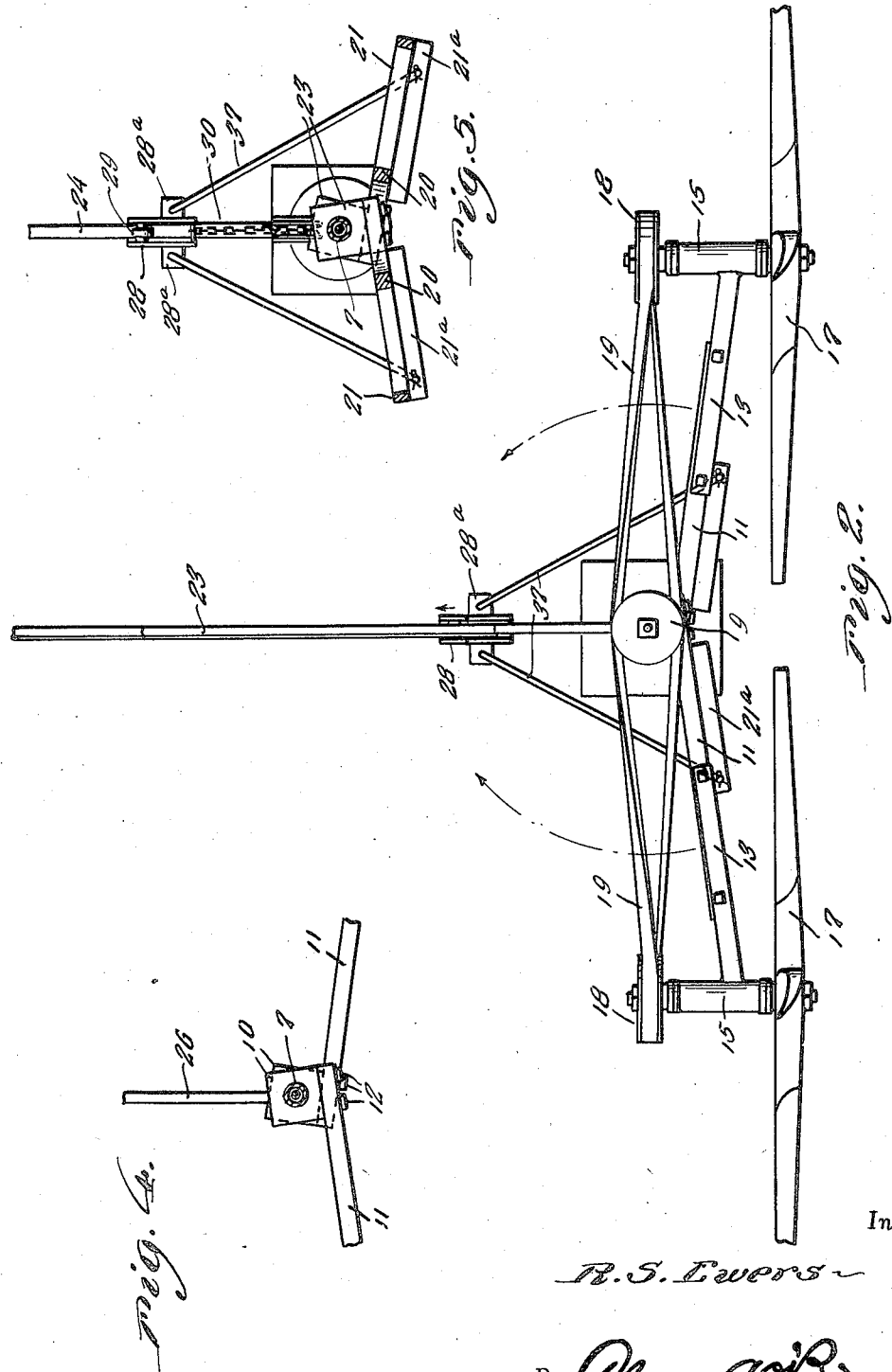
Figure 2 is a top plan view.

From the above it will be apparent that when the propellers 17 are revolving power is transmitted to the shaft 8 and power from this shaft may be used for driving any suitable mechanism. In the event of high winds, the propellers or wind wheels 17 and associated parts will swing out of the wind so that their axes will be substantially at right angles to the vane 23. The direction of movement of the wind wheels or propellers, into and out of operative position is indicated by broken lines and arrows in Figure 2.

The vane 23 is of suitable construction and includes a horizontal frame member or track 24 secured to a bracket 25 projecting from the casing 7; together with a diagonal arm 26 secured at one end to the casing 7 as at 27.

Rideable on the frame member of track 24 is a carriage 28, the same being in the form of a short panel member having its open side disposed upwardly. Suitably mounted in one end of the carriage 28 is a roller 29 that is rideable over the top surface of the rail 24. Connected to the carriage 28 is one end of a flexible element, in the present instance a chain 30, and to the free end of the chain is connected one end of a rod 31 that operates in an opening provided in an intermediate collar 6. On the lower or free end of the rod 31 is a plate 32 providing a support for any suitable number of superimposed weights 33. The weights 33 are substantially rectangular as suggested in Figure 6 and are provided with suitable notches 34 for accommodating the casing 7; suitable notches 35 for accommodating the rod 31 and with suitable notches 36 accommodating a retaining pin 37 that extends upwardly from the plate 32 and serves to prevent undue rotative or lateral movement of the weights 33. Obviously any number of weights 33 may be used as found desirable. The horizontal arms 21 of the aforementioned braces are provided with apertured flanges 21a as clearly shown in Figure 5 while apertured flanges 28a project laterally from opposite sides of the carriage 28. Rods 37 have suitably formed ends to engage in the apertures of the flanges 21a and the flanges 28a of the carriage as shown in Figures 3 and 5 so that rotative movement of the braces and associated parts will be transmitted to the carriage 28, for moving the carriage to the right in Figure 3 upon a swinging movement of the braces incidental to a movement of the wind wheels out of the wind and to a position with their axes at substantial right angles to the vane 23. Also, when the wind decreases the carriage 28 under a pull exerted by the weights 33 will move in a reverse direction or to the left (reference being had to Figure 3) whereupon through the connection between the carriage and the braces the arms 11 and associated parts will be swung to the position shown in Figure 1 so that the wheels are again turned into the wind. Chain 30 is trained over pulley 38 mounted in bracket 25. When it is not desired to have the device operate the weights 33 may be removed whereupon the arms 11 and associated parts will swing back to a position substantially paralleling the vane 23.

Also, by adjusting the arms 13 relative to the arms 11 slack in the belts 19 may be readily taken up.

Having thus described the invention, what is claimed as new is:

1. In a wind motor, a vertical casing, a driven shaft operating in said casing, a pair of arms connected at one end with the casing to rotate about the casing as an axis, supports adjustably secured to said arm, horizontal bearings extending transversely of the supports at the outer ends thereof, shafts journaled in said bearings, wind wheels on one end of said shafts, belt and pulley drive means connecting the last named shafts with the first named shaft, and weight means connected with said arms for normally retaining the arms in reversely extending position; said weight means being responsive to wind pressure on the wheels to permit said arms to pivot about said casing into a position substantially paralleling one another.

2. In a wind motor, a tower, a vertical casing, mounted on the tower, a wind vane connected with said casing and fixed relative thereto, a vertical driven shaft operating in said casing, a pair of arms connected at one end with the casing one above the other and for rotation about the casing as an axis, supports adjustably secured to each of said arms, wind wheels on the outer ends of said supports and mounted to rotate on axes transverse to said supports, said vane including a fixed horizontal rail, a carriage mounted to move along said rail, means connecting said carriage with said arms for transmitting movement to said arms from the carriage and vice versa, and suspended weight means connected with the carriage for normally urging the latter in one direction, said weight means being provided with notches therein for slidable engagement with said casing.

3. In a wind motor, a tower, a vertical casing, rotatably mounted in the tower, a driven shaft in said casing, pulleys on the upper end of the driven shaft, longitudinally adjustable arms, means connecting said arms at one end with the casing for swinging movement about the casing as an axis, wind wheels mounted on the free ends of said arms and including shafts extending transversely of said arms, pulleys on said wind wheel shafts, belts connecting the first named pulleys with the second named pulleys, braces for said arms, means connecting said braces at one end with said casing for rotative movement about the casing as an axis, a wind vane extending from said casing and including a fixed rail, a carriage moveable along said rail, weight means connected with the carriage for normally urging the same in a direction toward said casing, said weight means being provided with notches therein for the insertion of the casing whereby said weight may slide longitudinally of said casing, and rods connecting said carriage with said brace members.

ROLO S. EWERS.